US010797857B2

(12) United States Patent
Debout et al.

(10) Patent No.: US 10,797,857 B2
(45) Date of Patent: Oct. 6, 2020

(54) DATA INTERLEAVING SCHEME FOR AN EXTERNAL MEMORY OF A SECURE MICROCONTROLLER

(75) Inventors: Vincent Debout, La Ciotat (FR); Frank Lhermet, Roquevaire (FR); Yann Loisel, La Ciotat (FR); Alain-Christophe Rollet, La Ciotat (FR)

(73) Assignee: Maxim Integrated Products, Inc., San Jose, CA (US)

( * ) Notice: Subject to any disclaimer, the term of this patent is extended or adjusted under 35 U.S.C. 154(b) by 573 days.

(21) Appl. No.: 13/483,669

(22) Filed: May 30, 2012

(65) Prior Publication Data

US 2012/0311239 A1 Dec. 6, 2012

(30) Foreign Application Priority Data

May 30, 2011 (FR) ...................................... 11 54694

(51) Int. Cl.
*G06F 12/14* (2006.01)
*H04L 9/06* (2006.01)
*H04L 9/08* (2006.01)

(52) U.S. Cl.
CPC .............. *H04L 9/06* (2013.01); *H04L 9/0894* (2013.01); *G06F 12/14* (2013.01)

(58) Field of Classification Search
CPC .......... H04L 9/0894; H04L 9/06; G06F 12/14
(Continued)

(56) References Cited

U.S. PATENT DOCUMENTS 8,055,970 B1 * 11/2011 Smith ................. H03M 13/091
714/752
2006/0074960 A1 * 4/2006 Goldschmidt ......... H03M 13/11
(Continued)

FOREIGN PATENT DOCUMENTS

CN 1779689 A 5/2006
EP 0511807 A1 11/1992
(Continued)

OTHER PUBLICATIONS

Translation of the International Search Report dated Jun. 1, 2012, in priority International Application No. PCT/EP2012/053951, filed Mar. 8, 2012.
(Continued)

*Primary Examiner* — David Yi
*Assistant Examiner* — Zubair Ahmed
(74) *Attorney, Agent, or Firm* — North Weber and Baugh LLP; Michael V. North

(57) ABSTRACT

The invention relates to methods of interleaving payload data and integrity control data in an external memory interfaced with a microcontroller to improve data integrity check, enhance data confidentiality and save internal memory. Data words are received for storing in the external memory. Each data word is used to generate a respective integrity word, while an associated logic address is translated to two physical addresses in the external memory, one for the data word and the other for the integrity word. The two physical addresses for the data and integrity words are interleaved in the external memory, and sometimes, in a periodic scheme. In particular, each data word may be associated to an integrity sub-word included in an integrity word having the same length with that of a data word. The external memory may have dedicated regions for the data words and the integrity words, respectively.

19 Claims, 9 Drawing Sheets

(58) Field of Classification Search
USPC .................................................. 711/1–200
See application file for complete search history.

(56) References Cited

U.S. PATENT DOCUMENTS

| | | | | |
|---|---|---|---|---|
| 2006/0080553 | A1* | 4/2006 | Hall | G06F 12/0875 713/189 |
| 2007/0285229 | A1 | 12/2007 | Batra et al. | |
| 2008/0301403 | A1* | 12/2008 | Arntzen | G06F 11/1052 712/22 |
| 2009/0048978 | A1* | 2/2009 | Ginter et al. | 705/51 |
| 2009/0100307 | A1* | 4/2009 | Lee | 714/746 |
| 2010/0106954 | A1* | 4/2010 | Muchsel | G06F 21/71 713/2 |
| 2010/0235633 | A1* | 9/2010 | Asano | G06F 21/10 713/167 |

FOREIGN PATENT DOCUMENTS

| | | |
|---|---|---|
| EP | 2221750 A1 | 8/2010 |
| JP | 2009301482 A | 12/2009 |

OTHER PUBLICATIONS

Translation of the Written Opinion dated Jun. 1, 2012, in priority International Application No. PCT/EP2012/053951, filed Mar. 8 2012.

Translation of the International Preliminary Report on Patentability dated Sep. 10, 2013, in priority International Application No. PCT/EP2012/053951, filed Mar. 8, 2012.

First Office Action dated Apr. 1, 2016, in Chinese Patent Application No. 201210172262.7 (26pgs).

Response to first Office Action filed in Aug. 2016, in Chinese Patent Application No. 201210172262.7 (22pgs).

Office Action dated Nov. 30, 2016, in Chinese Patent Application No. 201210172262.7 (23pgs).

Response filed Feb. 15, 2017, in Chinese Patent Application No. 201210172262.7 (10pgs).

Office Action dated May 31, 2017, in Chinese Patent Application No. 201210172262.7 (24pgs).

Office Action dated Dec. 28, 2017 in Chinese Patent Application No. 201210172262.7 (32pgs).

* cited by examiner

DATA INTERLEAVING SCHEME FOR AN EXTERNAL MEMORY OF A SECURE MICROCONTROLLER

CROSS REFERENCE TO RELATED PATENT APPLICATIONS

The application claims the benefit of French Application Serial No. 11 54694, entitled "Data Interleaving Scheme for an External Memory of a Secure Microcontroller", filed on May 30, 2011, the subject matter of which is incorporated herein by reference.

BACKGROUND

A. Technical Field

The present invention relates generally to a secure microcontroller using an external memory, and more particularly to methods, systems and devices for performing integrity check by interleaving payload data and integrity control data in an external memory interfaced with a secure microcontroller.

B. Background of the Invention

A microcontroller is normally a single integrated circuit comprising a central processing unit (CPU) core, memory, and input/output (I/O) peripherals. A secure microcontroller is used for applications that involve trusted operations on valuable assets in an insecure environment where a thief or hacker may gain access to processor cores, memory devices or I/O peripherals that are used to communicate and process sensitive data. This sensitive data may include account numbers, access codes, personal identification number (PIN), cryptographic keys, financial transactions/balances, rights management, and metering (e.g., energy, units). In particular, this sensitive data may be programs or instructions employed to control the CPU core or the I/O peripherals. Various security features have been employed to avoid unauthorized access to these sensitive data. To date, the secure microcontroller has been applied in a wide range of security-critical applications such as electronic banking, commercial transactions, and pay-TV access control, or any application that requires the protection of proprietary software and methods.

Since the sensitive data may be stored in an external memory of the secure microcontroller, memory content confidentiality and integrity are two distinct threats that should be addressed. The first threat causes sensitive information disclosure (i.e., data confidentiality) where confidential data are revealed and weakness in a program is exposed. The second threat causes modification of application behavior (i.e., data integrity) which involves programs and data being modified in the external memory and results in a data integrity issue.

The secure microcontroller is designed to offer a level of security to the sensitive data stored in the external memory. For instance, physical security may be established against probing by anti-tampering enclosure. However, this solution may be expensive and does not cover new attack methods based on fault injection from power supply glitch, light, synchronous or asynchronous laser, or radioactive particles. The security features may also comprise memory encryption where the sensitive data stored in the external memory are encrypted or decrypted using cryptographic keys in the secure microcontroller during the data exchanging process. The cryptographic keys are stored locally within the secure microcontroller. As a result, the physical security perimeter can be limited to the microcontroller while the external memory and their communication buses can remain exposed physically.

It shall be noted that generally encryption does not provide by itself sufficient integrity protection. For instance, an encryption algorithm is used with Electronic Code Book mode (ECB), and no modification is detected on a corrupted cryptotext in the external memory. The corrupted cryptotext is decrypted to a plaintext, and due to actual data modification/corruption, the plaintext is associated with a different value than an expected value. However, since the decryption algorithm itself does not flag any error, the resulting plaintext is still regarded as a legitimate value. The underlying data format can be used to identify data corruption, and for some data formats, this corruption may be difficult to identify. A typical example of insufficient data integrity in a microcontroller is a financial transaction where only the money amount is encrypted. A modified cryptotext would lead to a corrupted plaintext, potentially corresponding to an amount larger than the actual amount.

Insufficient data integrity also occurs in protection of microcontroller instructions stored in the memory based on code encryption. When the memory is tampered, a randomly modified cryptotext instruction would be decrypted into a modified plaintext instruction that does not match with the original plaintext instruction. This erroneous plaintext instruction can be considered as legitimate according to the particular microprocessor instructions set and its coverage of a plain space. For instance, MIPS 4KSd core instructions are 32-bit long. Only 56% of any 32-bit instructions are associated with valid core instructions, and remaining 44% 32-bit instructions are considered by the microcontroller as unlawful and rejected by issuing a microcontroller exception. In another case, a 64-bit encryption algorithm, such as the Data Encryption Standard (DES), is used to handle two 32-bit words at a time for encryption/decryption. When a 64-bit cryptotext instruction is modified, the corresponding decrypted plaintext includes two 32-bit words, and the probability is approximately 30% for both of these two words to be legitimate core instructions. As a result, the probability is 70% to detect a cryptotext modification and an unlawful 32-bit instruction in a corrupted 64-bit DES system.

Data integrity control is implemented for the sensitive data stored in the external memory to detect any willing or unwilling corruption between what was originally sent for storage and what is stored in the memory. Specific integrity check methods are used to generate integrity control data (i.e., a tag or signature) during a memory write operation, and validity of the stored data are verified by its consistency with the corresponding integrity control data during a memory read operation. Integrity control constitutes a sufficient protection against fault injection attacks, and integrity control modules may be embedded in the secure microcontroller to ensure a sufficient level of trust to stakeholders.

Several integrity check methods may be employed. The simplest integrity check method is 1-bit even/odd parity check, wherein one integrity control bit is generated to maintain an even or odd parity among all the bits in the data. Alternative integrity check methods range from simple methods of cycling redundant check (CRC) or error correction/correcting code (ECC) to strong and proven methods, such as message authentication code (MAC). Despite their low security resistance, simple integrity check methods are mostly sufficient to protect against unwilling corruption; however, strong and proven methods are mandatory for protection against willing or active corruption. A simple method (e.g., ECC) normally does not involve secret keys, so attackers may easily generate consistent integrity data while modifying the sensitive data. A secret element (i.e., a cryptographic key) may be incorporated in some strong and proven integrity check methods. Attackers are prevented from an easy modification since the secret element needs to be recovered first.

FIG. 1 illustrates a secure microcontroller 102 interfacing with an encrypted memory 104. The aforementioned data confidentiality and integrity concerns are considered in this microcontroller. The secure microcontroller 102 comprises a CPU core 106, a memory controller 110 and buses for data, addresses and keys. Methods for integrity check, data encryption or data decryption are incorporated in the CPU core 102. During a memory write operation, original data are encrypted in the CPU core 106 to payload data for storing in the memory 104. During a memory read operation, payload data from the memory 104 are decrypted to original data in the CPU core 106.

Integrity control data are generated and commonly stored in an internal memory inside the CPU core 106 during a memory write operation, and extracted for data integrity check during a subsequent memory read operation. The integrity control data are commonly stored in a dedicated location using static memory addresses. This solution is applied in many prior art microcontrollers to store their respective integrity control data, e.g., the reference hash value in the U.S. Pat. No. 5,708,274 and the integrity check value in French Patent 1,885,709. This conventional solution may require intensive usage of internal memory, and therefore, may be an expensive solution, even though the data access rate is satisfactory.

SUMMARY OF THE INVENTION

Various embodiments of the present invention relate to a secure microcontroller using an external memory, and more particularly to methods, systems and devices for performing integrity check by interleaving payload data and integrity control data in an external memory interfaced with a secure microcontroller.

A plurality of data words and a plurality of logic addresses are generated in a microcontroller, and each data word is associated with a logic address. Each data word is used to generate a respective integrity word based on an integrity check method, while the associated logic address is translated to a first physical address for the data word and a second physical address for the integrity word in the external memory. The data words and the associated integrity words are interleaved in the external memory based on a data mapping method, and the physical addresses for the data and integrity words are dynamically determined. The external memory may be ROM, RAM or flash memory, and may have dedicated regions for the data words and the integrity words, respectively.

The data words and the integrity words are interleaved in a periodic scheme in the external memory. In particular, each data word may be associated to an integrity sub-word, and several integrity sub-words form an integrity word having the same length with that of a data word. Therefore, associated data words alternate with this integrity word in a periodic scheme.

The microcontroller using an external memory to store the data and integrity words is configured to generate two physical addresses in the external memory for each data word and associated integrity word. In particular, an embedded encryption and integrity protection block may comprise an address translator to implement a data mapping method, and an integrity control data generator to generate integrity words. The involved data words and integrity words are stored in the external memory. For use in a secure microcontroller, the embedded encryption and integrity protection block also comprises a plurality of function blocks for data encryption/decryption and temporary storage of integrity sub-words.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 illustrates a secure microcontroller interfacing with an external memory where security and integrity concerns are considered.

DETAILED DESCRIPTION OF THE PREFERRED EMBODIMENTS

The present invention relates generally to a secure microcontroller using an external memory, and more particularly to methods, systems and devices for performing integrity check by interleaving payload data and integrity control data in an external memory interfaced with a secure microcontroller.

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
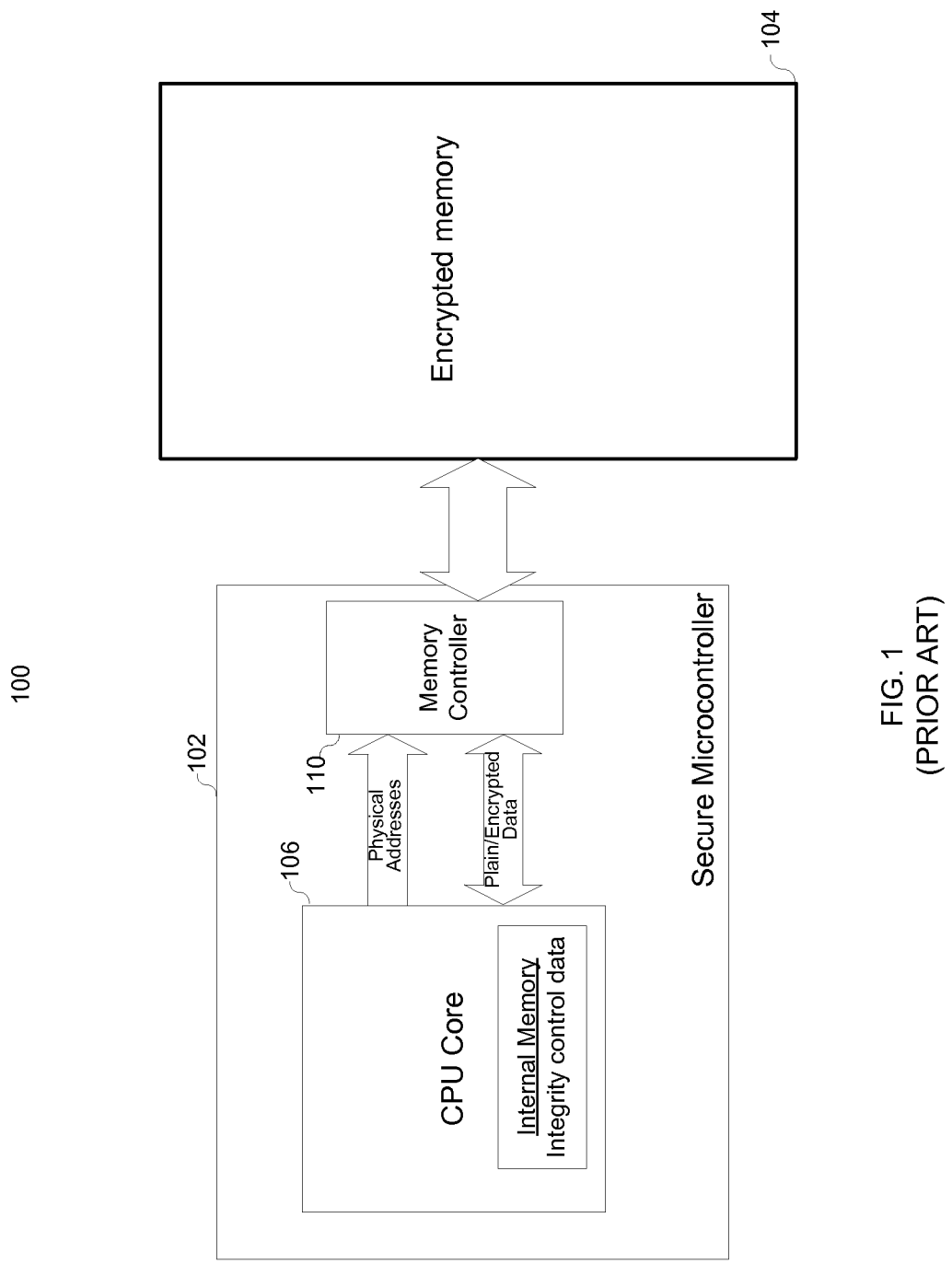
Figure 2:
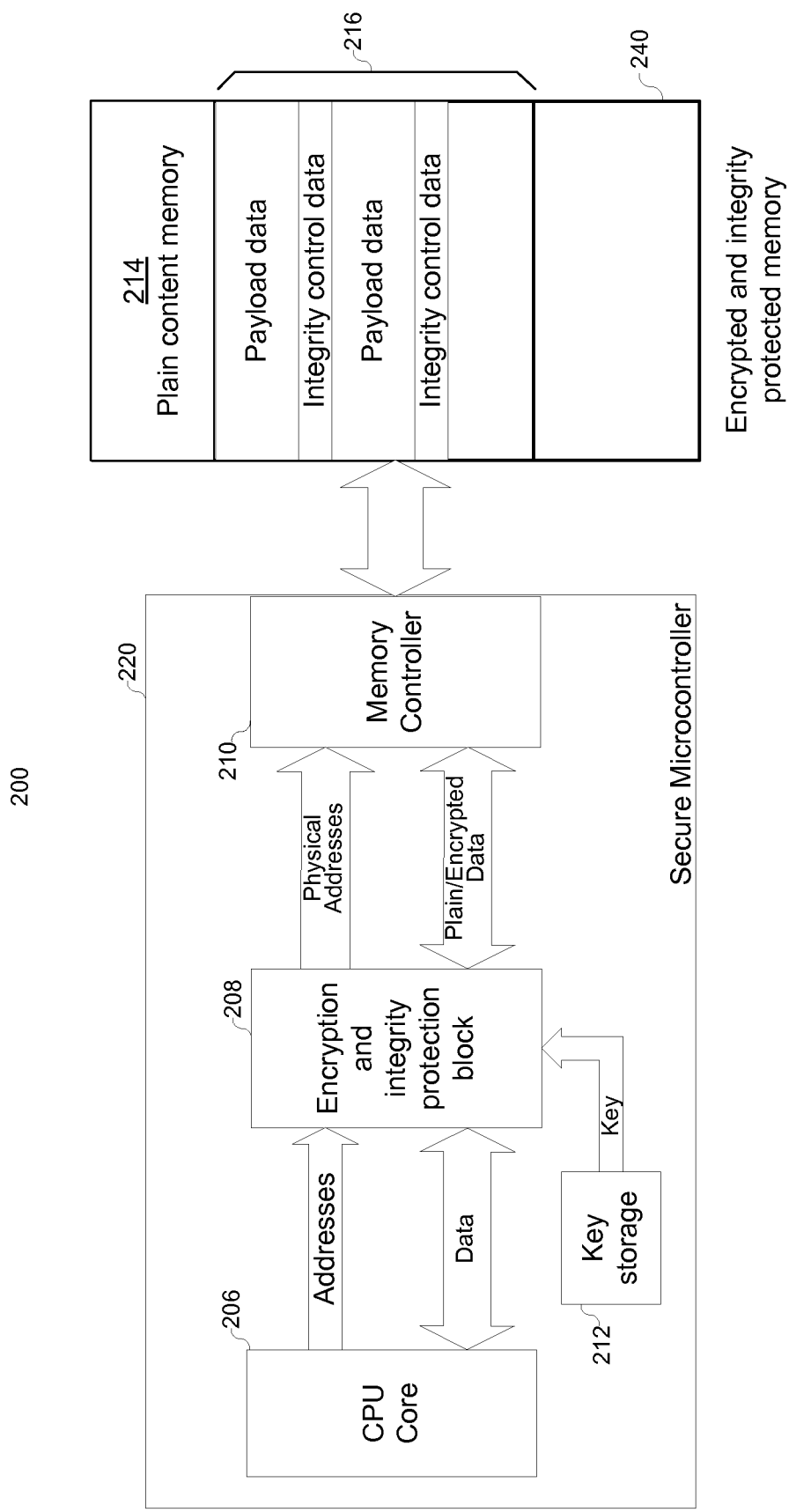
FIG. 2 illustrates an exemplary block diagram of a secure microcontroller system comprising a secure microcontroller interfacing with an external memory according to various embodiments of the invention.

FIG. 2 illustrates an exemplary block diagram 200 of a secure microcontroller system comprising a secure microcontroller 220 interfacing with an external memory according to various embodiments of the invention. The secure microcontroller 220 comprises a CPU core 206, an encryption and integrity protection block 208, a memory controller 210, a key storage 212 and buses for data, addresses and keys. The encryption and integrity protection block 208 is used to implement address mapping, integrity data computation, integrity check, data encryption and data decryption. In various embodiments of the present invention, integrity control data are generated by the block 208 and subsequently stored in the encrypted and integrity protected memory 240 (i.e., external memory 240) so that internal memory space in the CPU core 206 does not need to be reserved for integrity control data. Accordingly, the encryption and integrity protection block 208 and the memory controller 210 are adjusted to generate and access physical addresses in the external memory not only for payload data but also for the corresponding integrity control data. In various embodiments of the present invention, integrity management (e.g., ECC) is implemented in the block 208 rather than in the external memory 240 although certain memories, such as NAND flash, may also provide integrity management.

The external memory 240 is partitioned to at least one plain content region 214, and at least one encrypted content region 216. The content stored in the encrypted content region 216 may comprise payload data and integrity control data. The payload data are encrypted programs or data associated with confidential information, e.g., user names, passwords, transactions etc. Each integrity control data is derived from the original data or encrypted data (i.e., payload data) according to a specific integrity check method which may be proprietary in some instances.

Payload data and integrity control data are stored as payload data words (i.e., data words) and integrity control data words (i.e., integrity words) in the external memory 240, respectively, and lengths of these words are associated with memory type and methods for encryption and integrity check. One convenient solution is to store the data words and the integrity control data words in their respective dedicated regions in the external memory 240. Memories within specific address ranges are configured to store the data words and the integrity control data, respectively. As a result, a data word and its associated integrity word are stored at two memory cells that may be physically distant from each other and may even be located at two separate memory pages.

In various embodiments of the present invention, the integrity words are interleaved with the data words in the external memory 240 according to a regular data interleaving scheme to improve performance. The regular data interleaving scheme simplifies data flow and avoids jump mechanism by retrieving the integrity words in dedicated integrity storage locations that are adjacent to associated data storage locations. In particular, the regular data interleaving scheme is preferred for paginated memories, such as SDRAM, wherein jumping among pages requires extra page switching time and degrades memory access rate significantly. In one embodiment, a periodic scheme is employed wherein every few data words may be interleaved with an integrity word directly associated with these data words. In order to implement the regular data interleaving scheme, the encryption and integrity protection block 208 performs an automatic remapping of the external memory 240 such that the CPU core 206 may fetch data and programs/instructions without identifying addresses for associated integrity words.

The external memory 240 is allocated to store the payload data and the integrity control data dynamically. In certain embodiments, the external memory 240 may comprise more than one memory among RAM, ROM and flash memory. The secure microcontroller 220 interfaces to various memories in the external memory 240 without configuring dedicated data regions for each memory. As more than one memory is involved, address mapping for certain data interleaving schemes is implemented dynamically in the encryption and integrity protection block 208.

In certain embodiments, during a memory write operation, the CPU core 206 provides data and logic addresses to the encryption and integrity protection block 208 which further encrypts the data to payload data using an encryption method. The encryption method is based on the logic addresses and a key, and the key is fixed or randomly generated by the CPU core 206 and stored in the key storage 212. In one embodiment, the encryption method is directly based on a physical address translated from the logic address. Integrity control data are generated in the encryption and integrity protection block 208 using a predetermined integrity check method based on the data. In certain embodiments, at least one cryptographic key is used to generate the integrity control data. In addition to encrypting the data and generating the corresponding integrity control data, the block 208 also translates the input logic addresses to two separate physical addresses, one for the payload data and the other for the integrity control data. The memory controller 210 identifies the physical addresses in the external memory 240 and stores the payload data and the integrity control data as specified by the physical addresses.

In certain embodiments, during a memory read operation, a logic address is provided by the CPU core 206 to extract specific payload data from the external encrypted and integrity protected memory 240. The encryption and integrity protection block 208 translates the logic address to recover two physical addresses for the payload data and the associated integrity control data, respectively. The method used in this address-recovery process is similar to the method used to translate the logic address when the data need to be stored during the memory write operation.

The memory controller 210 enables the access to memory contents stored at the specified physical addresses, and the encryption and integrity protection block 208 is coupled to receive the payload data and the integrity control data from the encrypted and integrity protected memory 240. A decryption method may be implemented to use the logic address and the key stored in the key storage 212 to recover the payload data while the associated integrity data are extracted from the memory 240. Data recovered from the payload data are processed using the same integrity check method that is formerly used to generate the integrity control data. If the integrity control data regenerated from the recovered data are consistent with the integrity control data extracted from the external memory 240, then the recovered data are valid and subsequently provided to the CPU core 206; otherwise, an error is acknowledged and a dedicated hardware is employed to raise a CPU exception based on the security policy of the microcontroller. In various embodiments of the present invention, the CPU exception may be exploited to erase the sensitive data, trigger a non-maskable interruption, write a value in a flag register, reset the microcontroller, or run a dedicated code.

Data interleaving enhances cost efficiency of the secure microcontroller. In a conventional secure microcontroller, the integrity control data are stored in the internal memory, while in the present invention, this internal memory may be spared since at least a portion associated with the integrity control data is moved to the encrypted and integrity protected memory 240 located externally to the CPU core. The cost for the CPU core will be largely reduced due to availability of this secure integrity data storage in the external memory.

Figure 3A:
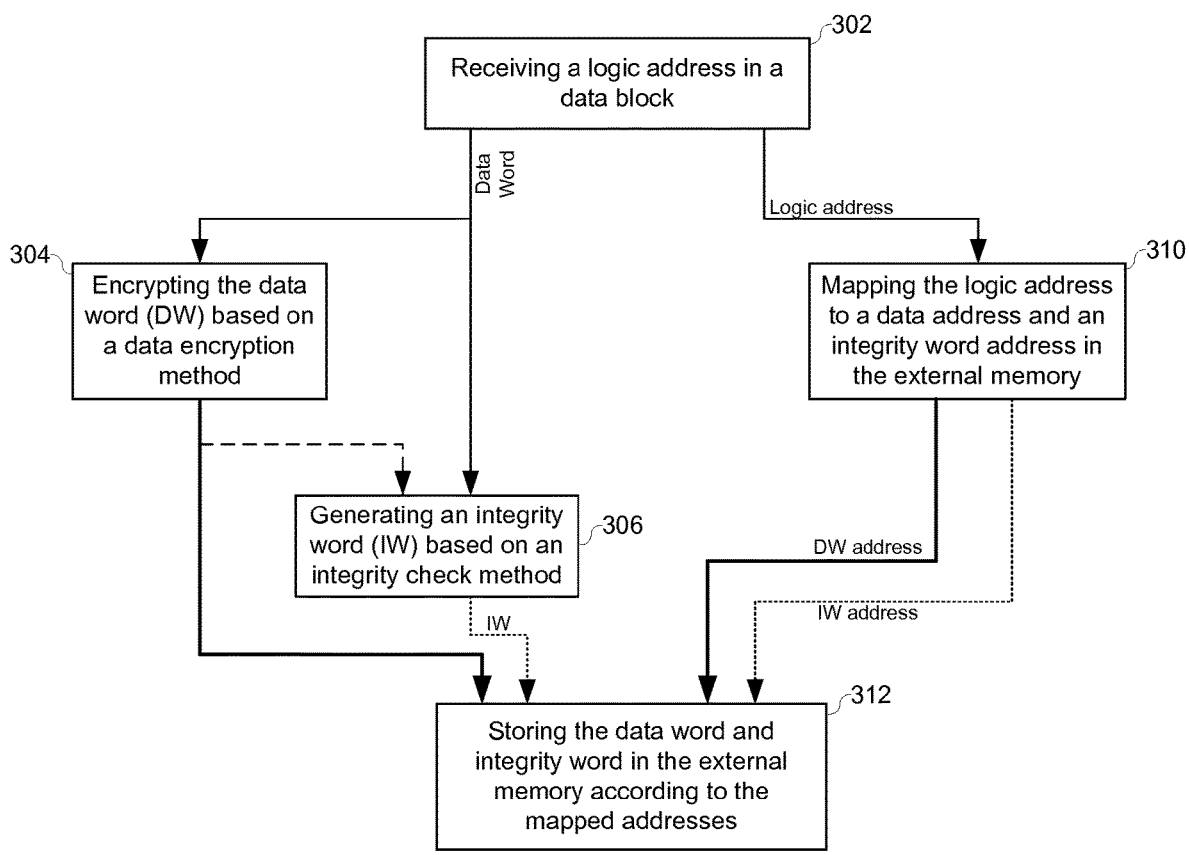
FIG. 3(a) illustrates a method of generating and storing interleaving data word and integrity word in the external memory according to various embodiments of the invention.

FIG. 3(a) illustrates a method 300 of generating and storing interleaving data and integrity words in the external memory 240 according to various embodiments of the invention. A data word and its logic address within a data block are received at step 302. The data word is further encrypted based on a predetermined encryption method at step 304, and an integrity word is generated from the data word based on a predetermined integrity check method at step 306. In one embodiment, the integrity word may also be generated from the encrypted data word (i.e., payload data). The logic address is mapped to two physical addresses in the external memory at step 310, one physical address for the encrypted data word (i.e., payload data) and the other physical address for the integrity word (i.e., integrity control data). A data interleaving scheme may be incorporated in step 310. As a result, the data word and the integrity word may be stored in the memories addressed by the two physical addressed, respectively, at step 312.

Figure 3B:
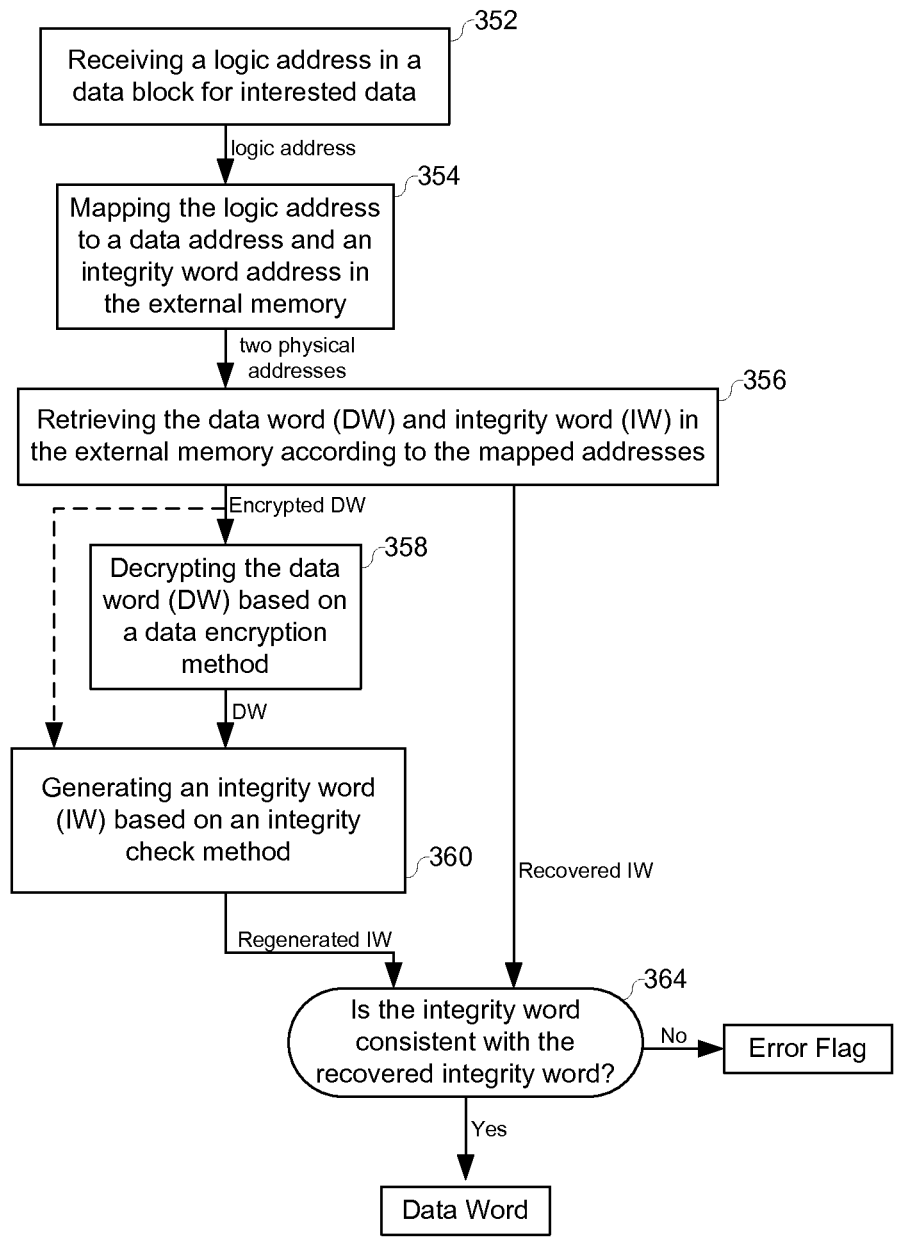
FIG. 3(b) illustrates a method of extracting a data word and an integrity word from an external memory according to various embodiments of the invention.

FIG. 3(b) illustrates a method 350 of extracting a data word and an integrity word from an external memory 240 according to various embodiments of the invention. A logic address within a data block is received at step 352 for an interested data word. The logic address is used to identify two physical addresses for the data word and integrity word at step 354 according to a data interleaving scheme. The data word and integrity word are therefore extracted from the specified physical addresses at step 356. The data word is decrypted at step 358 based on a decryption method reverse to an encryption method, and the decrypted data word is further used to generate a regenerated integrity word at step 360 using an integrity check method. In one embodiment, the regenerated integrity word may also be generated from the encrypted data word. The extracted integrity word from the external memory is generated by the same integrity check method during a prior encryption process, and therefore, the consistency between the recovered integrity word and the regenerated integrity word is applicable at step 364 for data verification. If the consistency exists, the data word extracted from the external memory may be outputted; otherwise, an error flag should be output.

Figure 4:
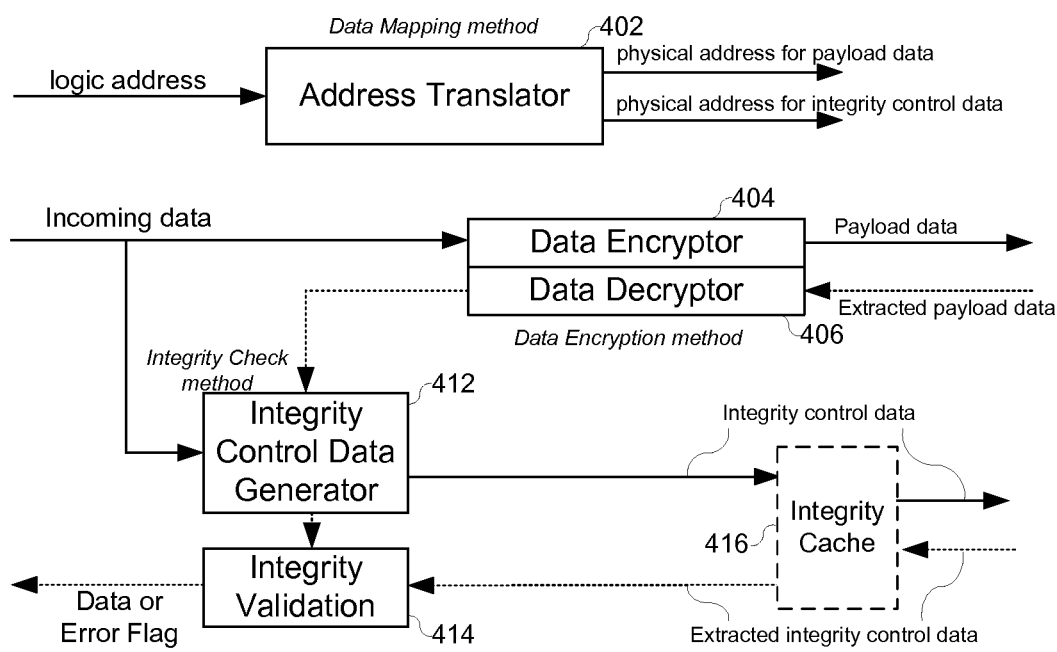
FIG. 4 illustrates an exemplary block diagram of the encryption and integrity protection block according to various embodiments of the invention.

Various structures are incorporated in the encryption and integrity protect protection block 208 to implement critical functions of data encryption/decryption, integrity word generation, integrity check and address mapping. FIG. 4 illustrates an exemplary block diagram 400 of the encryption and integrity protection block 208 according to various embodiments of the invention. The encryption and integrity protection block 400 comprises an address translator 402, a data encryptor 404, a data decryptor 406, an integrity control data generator 412, and an integrity validation block 414. The aforementioned memory write and read processes are labeled in solid and dashed lines, respectively. A logic address is translated to two respective physical addresses for the payload data and the integrity control data in the address translator 402 during both memory write and memory read operations. During a memory write operation, incoming data are encrypted to payload data in the data encryptor 404, while integrity control data are generated in the integrity control data generator 412. During a memory read operation, the payload data are extracted from the external memory 240, decrypted in the data decryptor 406, and used to regenerate integrity control data in the integrity control data generator 412. The integrity control data are further compared with the extracted integrity control data in the integrity validation block 414. Decrypted data or an error flag is outputted regarding to valid or invalid payload data extracted from the external memory, respectively.

Access integrity control data introduces delays to read and write operations of the payload data. Each time the payload data are read or written, the associated integrity control data is read from or written to the external memory. The memory access time can be largely degraded. Therefore, in certain embodiments, an integrity cache 416 may be used to enhance the memory access rate by temporarily storing the integrity control data during consecutive read or write operations. The integrity cache 416 is different from a CPU cache included in the CPU core. In various embodiments, consecutive data words are associated with different integrity sub-words in one integrity control data word. An integrity control data word may be read in one memory read operation, and stored in the integrity cache 416 for use by several consecutive payload data read operations. A plurality of integrity control data sub-words may be combined using the integrity cache 416 and a combining block during consecutive memory write operations, and written into the external memory 240 within one memory write operation.

Several methods may be employed to write into or read from the external memory of a secure microcontroller. These methods include a data mapping method, a data encryption method, and an integrity check method. The data encryption method may be reversed to provide the corresponding data decryption method. Particularly, in various embodiments of the present invention, the data interleaving scheme is integrated in the data mapping method in the address translator 402.

In the encrypted and integrity protected memory 240, the payload data and the integrity control data are interleaved according to a certain data interleaving scheme, and two physical addresses are translated from every logic address accordingly during the memory read and write operation. In particular, there are various embodiments of regular data interleaving schemes in which payload data and integrity control data are arranged in a periodic configuration. In one embodiment, every payload data word is followed by a relevant integrity control data word. In another embodiment, several payload data words forms a payload data block, and each payload data block is followed by one integrity control data word or block, which contains the integrity control data of all the payload data words included in the payload data block. The payload data and the relevant integrity control data may not be physically located together in the memory 240. The data interleaving scheme directly determines the data-mapping method used by the address translator 402 to translate one logic address to two different physical addresses for the payload data and the integrity control data during the memory read and write operations.

Figure 5:
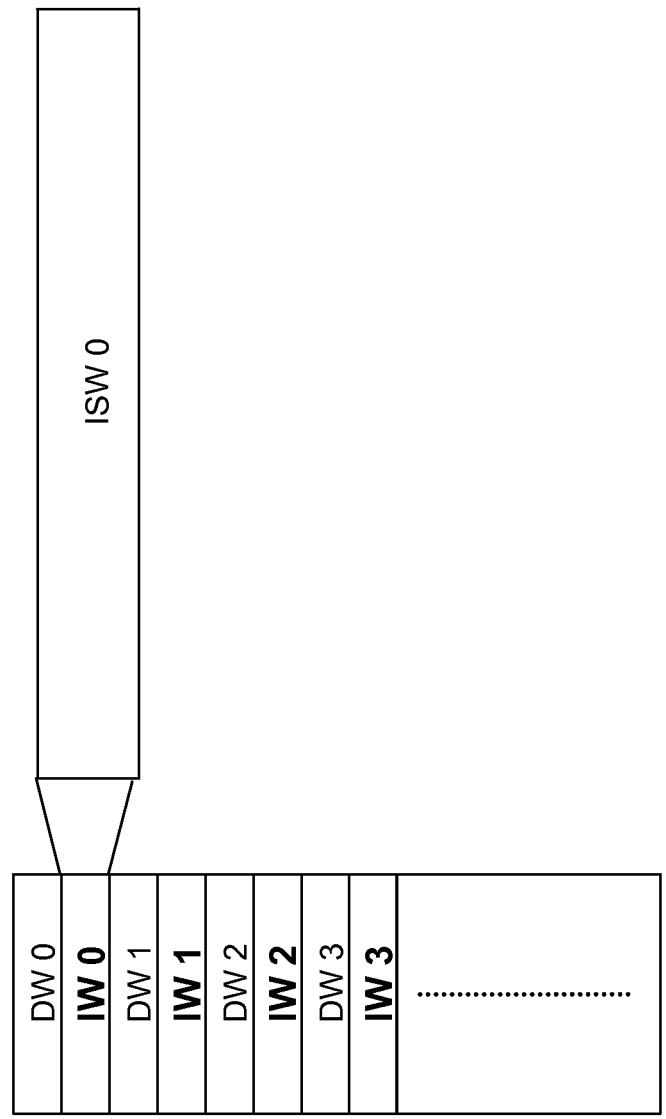
FIG. 5 illustrates an exemplary data interleaving scheme in the external memory according to various embodiments of the invention.

FIG. 5 illustrates an exemplary data interleaving scheme 500 in the external memory 240 according to various embodiments of the invention. Every payload data word (i.e., data word, DW) is directly followed by one integrity control data word (i.e., integrity word, IW) which is related with the precedent payload data word based on an integrity check method. For example, the lengths of the data words and the integrity control data words may be 16-, 22-, 54- or 128-bit as specified by the external memory specification. In certain embodiment, the length of the data words and the length of the integrity words are not equal, and may be less than the word length allowed by the external memory. Zeros or ones may be used to fill the unused bits. The unused bits may be the first few bits or the last few bits, and they may also be randomly mixed with the used bits as far as their locations are tracked by the memory controller 210.

In various embodiments of the present invention, every few number of data words are interleaved with one integrity word of the same length in the external memory 240. This integrity word consists of several integrity sub-words (ISW) that have an equal length. Each ISW is an integrity word related to a payload data word based on an integrity check method. Therefore, the number of the integrity sub-words is equal to the number of the data words. The data words stored in the external memory are i-bit wide, wherein i is an integer. The length of each ISW, ISW length, is a fraction of the data word length i, and may be derived as:

$$ISW_{length} = \frac{i}{n} \quad (1)$$

where n is the number of data words and the number of integrity sub-words. The equation (1) is applicable to periodic data interleaving schemes in which the integrity sub-words have an equal length.

Figure 6:
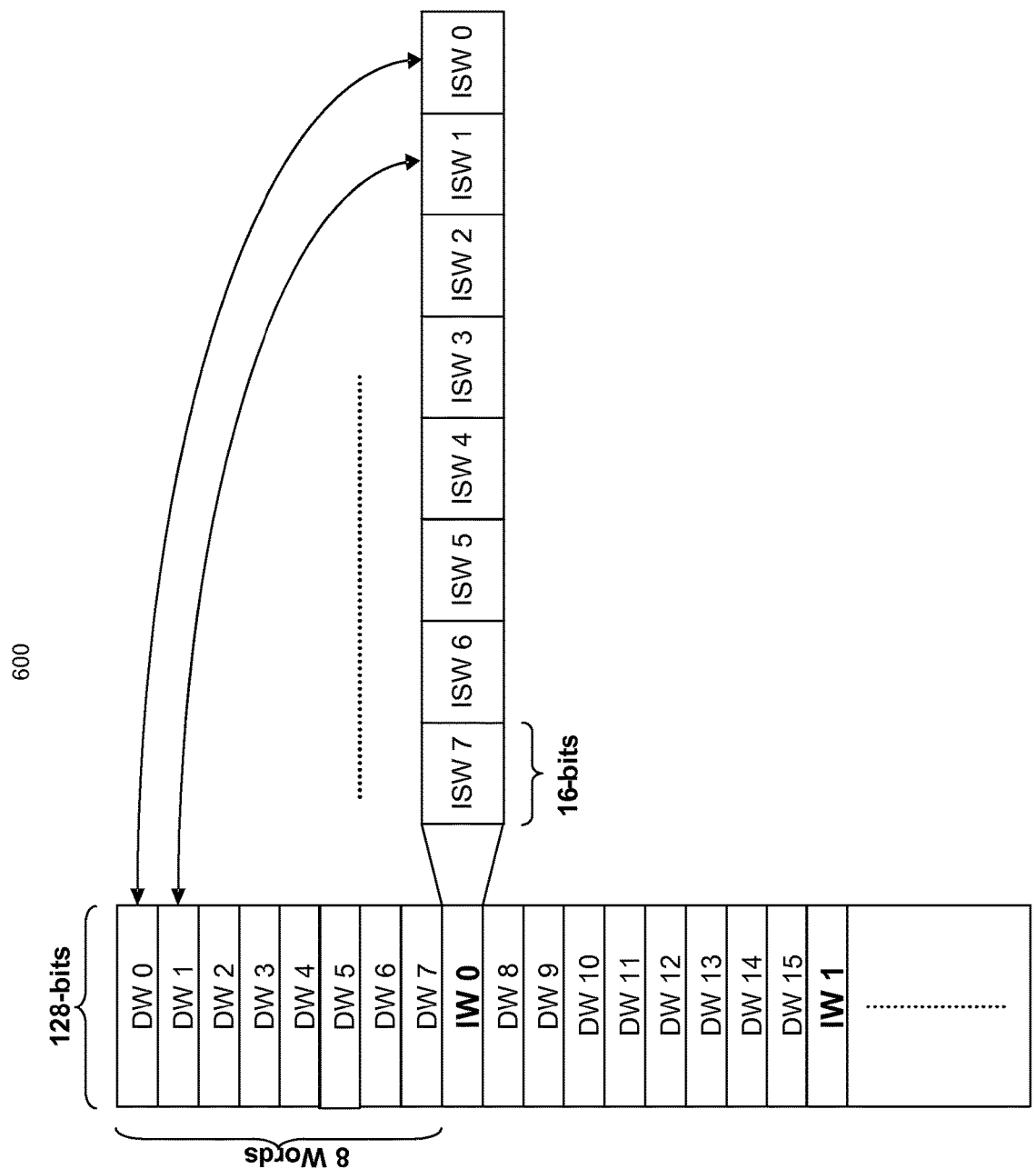
FIG. 6 illustrates another exemplary data interleaving scheme in the external memory according to various embodiments of the invention.

FIG. 6 illustrates another exemplary periodic data interleaving scheme 600 in the memory 240 according to various embodiments of the invention. Every eight 128-bit data words are alternated with one 128-bit integrity control data word that consists of eight 16-bit integrity sub-words. Each of the eight 16-bit integrity sub-words is successively related with each of the eight 128-bit payload data words based on the integrity check method. In this embodiment, a 128-bit integrity word IW0 consists of eight 16-bit integrity sub-words ISW0-ISW7, and ISW0-ISW7 correspond to eight successive data words DW0-DW7, respectively. In particular, the integrity sub-word ISW0 which occupies the least significant 16 bits of IW0 is related to the first data word DW0, while the integrity sub-word ISW7 which occupies the most significant 16 bits of IW0 is related to the last data word DW7. In this embodiment, the data interleaving scheme is consistent with equation (1), and the integers i and n are equal to 128 and 8, respectively.

Figure 7:
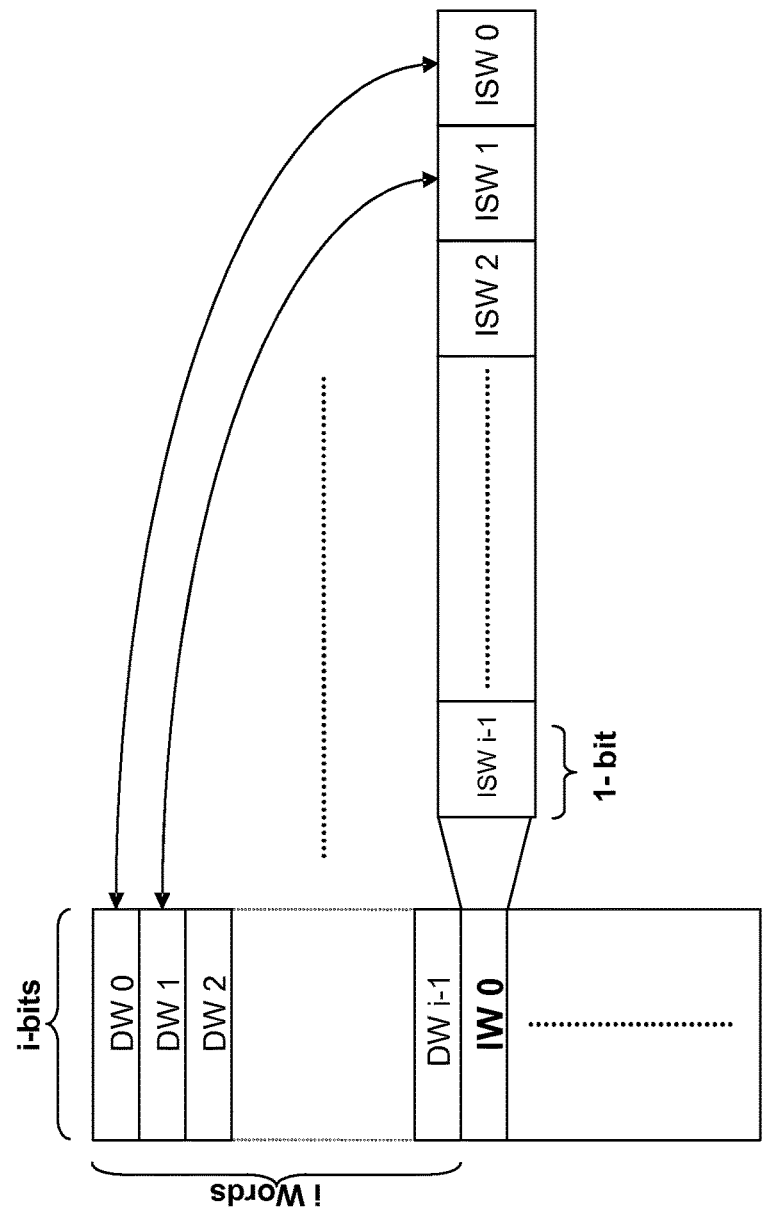
FIG. 7 illustrates an exemplary data interleaving scheme in the external memory according to various embodiments of the invention.

FIG. 7 illustrates an exemplary data interleaving scheme 700 in the external memory 240 according to various embodiments of the invention. The length for each integrity sub-word relevant to each data word is 1-bit. The data word length i and the number of ISW n are equal. The 1-bit integrity control word may be generated from even/odd parity check. The i-bit payload data words are successively related with 1-bit integrity control words based on a certain integrity check method. The first data word DW0 is associated with ISW0 which is the least significant bit of the i-bit integrity word, while the last data word $DW_{i-1}$ is associated with $ISW_{i-1}$ which is the most significant bit of the i-bit integrity word. Due to the ISW length of 1 bit, this embodiment is a limit case that may be represented by equation (1).

Figure 8:
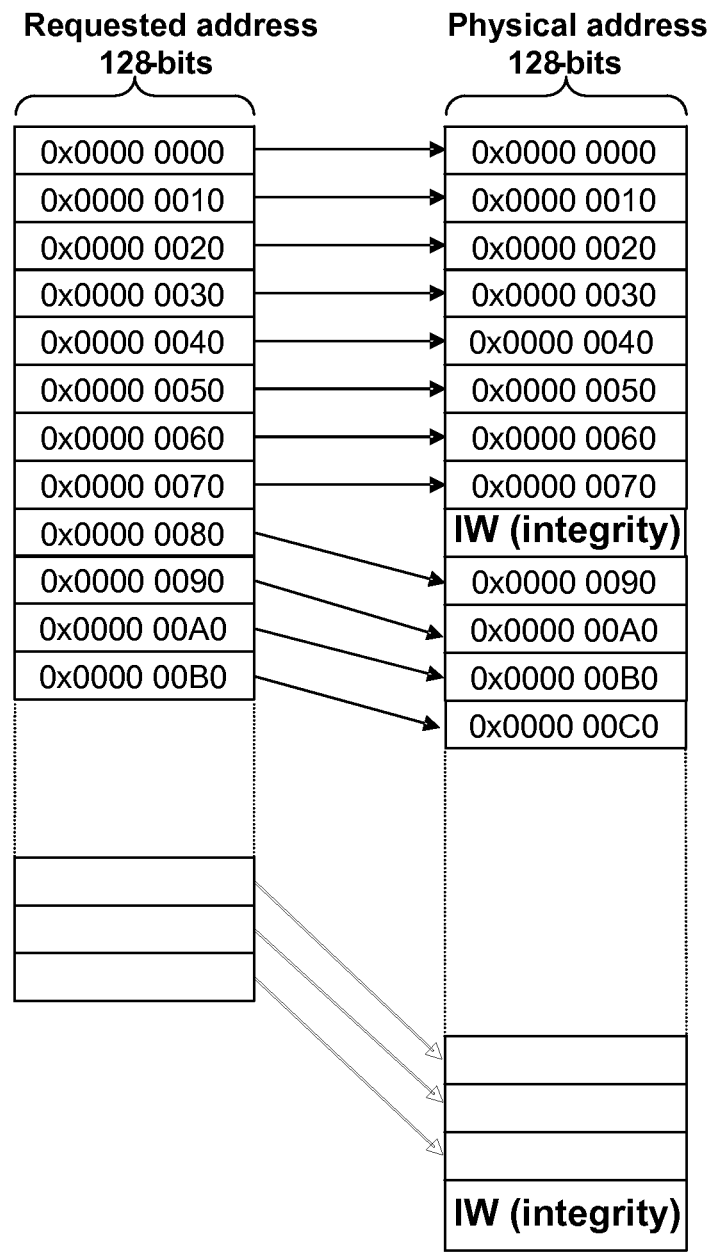
FIG. 8 illustrates an exemplary method of mapping logic addresses of data in a data block to physical addresses in the external memory according to a data interleaving scheme according to various embodiments of the invention.

FIG. 8 illustrates an exemplary method 800 of mapping logic addresses of data in a data block to physical addresses in the external memory 240 according to a certain data interleaving scheme according to various embodiments of the invention. Equations are required to convert the logic addresses to physical addresses. In the embodiment illustrated in FIG. 5, every eight 128-bit payload data words are interleaved with one 128-bit integrity control data word. An x-th payload data word within an incoming data block may be mapped to the y-th word within a resulting data block stored in the external memory. Both indexes of the incoming and resulting data start from 0. Based on the particular period data interleaving scheme, the relationship of the relative addresses x and y in the resulting data block may be represented as $$y = 9 \times \text{floor}\left(\frac{x}{8}\right) + \text{mod}(x, 8) \quad (2)$$

where floor(x/8) is a rounded result from dividing x by 8, and mod(x,8) is a remainder. As a result, every eight payload data are interleaved with one integrity control data whose relative address $Add_{IW}$ in the resulting data block is $$Add_{IW} = 9 \times \text{floor}\left(\frac{x}{8}\right) + 8 \quad (3)$$

The relative addresses for the payload data and the integrity control data are generated in the address translator 402, and further superimposed to a block address to identify their physical addresses in the external memory. Equations (2) and (3) are embedded in the data mapping method employed by the address translator 402.

One integrity word (IW) comprises a plurality of integrity sub-words (ISW) which occupy different bits of the IW. As a data word (DW) is stored in the external memory, an ISW (i.e., a plurality of bits in the IW) is written into a corresponding memory word as well. Integrity sub-words associated with successive data words form one integrity word and share a same physical address for the integrity word. In one embodiment, the integrity word is extracted once, and stored in the integrity cache 416. Integrity sub-words are extracted during successive read operations for various payload data. In one embodiment, the encryption and integrity protection block 208 uses the integrity cache 416 to store ISWs temporarily for a memory write operation. The block 208 awaits a complete integrity word to be derived from successive payload data before the complete integrity word may be stored in the memory word specified by the physical address of the integrity word. This embodiment allows a short memory access time during write operations. In another embodiment, the integrity word is extracted from the IW physical address, and the bits allocated to the present payload data word are overwritten with the ISW before the integrity word is stored back at the specified IW physical address in the external memory. Additional modules (e.g., integrity caches) and controls are integrated in the encryption and integrity protect block 208 to interleave data if a plurality of data words are associated with one word.

The data interleaving scheme is implemented by hardware and appears transparent to software used by the secure microcontroller. The software normally uses logic addresses without a need to use extra registers for configuring a data zone (i.e., block) in the external memory. In the present invention, the logic addresses are configured to physical addresses in the address translator. Both data confidentiality and data integrity are enhanced due to programming the data interleaving scheme in the hardware.

Although the periodic data interleaving scheme is preferred in some memories, e.g., SDRAM, those skilled in the art will recognize that more complex data interleaving scheme may be used. In one embodiment, a physical address of an integrity control data word may be generated from a special method reliant on a key. A complex data interleaving scheme will enhance data confidentiality, and create more obstacles for attackers to discern payload data from integrity control data in an external memory. In combination with data encryption methods, this complex data interleaving scheme provides a robust solution to protect a secure microcontrollers from a majority of tampering efforts. The methods used to implement complex data interleaving schemes are incorporated in the address translator 402, and cost for design and hardware increases with complexity of the data interleaving schemes.

A data interleaving scheme in an external memory is particularly useful to ensure data confidentiality and data integrity in a secure microcontroller. However, one of ordinary skill in the art may realize the interleaving data scheme is also applicable in conventional microcontrollers. These microcontrollers may need to save the cost of expensive CPU memories from storing the integrity control data. A data mapping method incorporated in the address translator may be used to implement the data interleaving scheme, and the memory controller may be routed to the external memory rather than the internal CPU memory.

For the above specification, reference to "payload data" means encrypted data that is associated with "data" that are provided by the CPU core 206 and stored in the memory 240. However, "payload data" may be equivalent to "data" in the case that no encryption/decryption is involved in memory write or read operations. The phrases "payload data word" and "data word" in various places in the specifications are equivalent. The phrases "integrity control data word" and "integrity word" in various places in the specifications are also equivalent. In various embodiments of the present invention, usage of "data" is associated with not only data related to confidential information (e.g., user names, passwords, transactions, and etc.) but also programs, instructions and codes executed by the CPU core.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method for securely storing data words and integrity words within an external memory of a microcontroller, the method comprising:
   receiving a plurality of data words and a plurality of logic addresses;
   associating each data word, within the plurality of data words, with a corresponding logic address within the plurality of logic addresses;
   generating a plurality of integrity words from the plurality of data words based on an integrity check method, each integrity word comprising a plurality of consecutive integrity sub-words of equal length, each integrity sub-word corresponding to a data word within the plurality of data words, each integrity word and the data words corresponding to the consecutive integrity sub-words within the integrity word have the same length;
   translating the plurality of logic addresses to a plurality of first physical addresses within the external memory and a plurality of second physical addresses within the external memory based on a data map, wherein the plurality of first physical addresses and the plurality of second physical addresses are interleaved;
   encrypting the plurality of data words to a plurality of encrypted data words;
   storing the plurality of encrypted data words in the plurality of first physical addresses in the external memory; and
   storing at least one complete integrity word, within the plurality of integrity words, with its integrity sub-words derived from successive data words and combined in an integrity cache in the microcontroller prior to storing the complete integrity word in the plurality of second physical addresses in the external memory, wherein a least significant integrity sub-word is related to a first data word among the successive data words and a most significant integrity sub-word is related to a last data word among the successive data words, wherein the integrity cache is different from a CPU cache.

2. The method of claim 1 wherein the external memory is one selected from a group consisting of read-only-memory (ROM), random-access-memory (RAM) and flash memory.

3. The method of claim 1 wherein each integrity word, within the plurality of integrity words, has a first number of bits and each encrypted data word, within the plurality of encrypted data words, has a second number of bits, the first number of bits being equal to the second number of bits.

4. The method of claim 1 wherein the plurality of encrypted data words and the plurality of integrity words are interleaved in the external memory.

5. The method of claim 4 wherein a subset of the plurality of encrypted data words are associated with an integrity word having a plurality of integrity sub-words corresponding to the subset of the plurality of encrypted data words, the subset being stored with the integrity word in an interleaved scheme within the external memory.

6. The method of claim 5 wherein the subset of the plurality of encrypted data words has eight encrypted data words and the integrity word has eight integrity sub-words.

7. A method for securely storing data words and integrity words within an external memory of a microcontroller, the method comprising:

receiving a plurality of data words and a plurality of logic addresses;

associating each data word, within the plurality of data words, with a corresponding logic address within the plurality of logic addresses;

generating a plurality of integrity words from the plurality of data words based on an integrity check method, each integrity word comprising a plurality of consecutive integrity sub-words of equal length, each integrity sub-word corresponding to a data word within the plurality of data words, each integrity word and the data words corresponding to the consecutive integrity sub-words within the integrity word have the same length;

translating the plurality of logic addresses to a plurality of first physical addresses within the external memory and a plurality of second physical addresses within the external memory based on a data map, wherein the plurality of first physical addresses and the plurality of second physical addresses are interleaved;

storing the plurality of data words in the plurality of first physical addresses in the external memory; and storing at least one complete integrity word, within the plurality of integrity words, with its integrity sub-words derived from successive data words and combined in the microcontroller prior to storing the complete integrity word in the plurality of second physical addresses in the external memory, wherein a least significant integrity sub-word is related to a first data word among the successive data words and a most significant integrity sub-word is related to a last data word among the successive data words, wherein the integrity cache is different from a CPU cache.

8. The method of claim 7 wherein the plurality of encrypted data words and the plurality of integrity words are interleaved in the external memory.

9. A secure microcontroller system comprising:

a central processing core that generates a plurality of data words and a plurality of logic addresses;

an encryption and integrity block, coupled to the central processing core, the encryption and integrity block generates a plurality of integrity words from the plurality of data words, encrypts the plurality of data words, and maps the plurality of logic addresses to a plurality of first physical addresses and a plurality of second physical addresses within an external memory, each integrity word comprising a plurality of consecutive integrity sub-words of equal length, each integrity sub-word corresponding to a data word within the plurality of data words, each integrity word and the data words corresponding to the consecutive integrity sub-words within the integrity word have the same length, wherein the encryption and integrity protection block further comprises an integrity cache for storing at least one complete integrity word with its integrity sub-words derived from successive data words of the plurality of integrity words and combined using the integrity cache prior to storing the complete integrity word in the plurality of second physical addresses in the external memory, wherein a least significant integrity sub-word is related to a first data word among the successive data words and a most significant integrity sub-word is related to a last data word among the successive data words, wherein the integrity cache is different from a CPU cache; and a memory controller, coupled to the encryption and integrity block, the memory controller stores the plurality of encrypted data words in the plurality of first physical addresses and the plurality of integrity words in the plurality of second physical addresses, wherein the plurality of first physical addresses and the plurality of second physical addresses are interleaved.

10. The secure microcontroller system in claim 9 wherein the plurality of encrypted data words and the plurality of integrity words are interleaved in the external memory.

11. The secure microcontroller system in claim 9 wherein the encryption and integrity protection block further comprises:

an integrity control data generator that generates a plurality of integrity words from the plurality of data words based on an integrity check method;

an address translator that translates the plurality of logic addresses to the plurality of first physical addresses and the plurality of second physical addresses based on a data map; and a data encryptor that encrypts the plurality of data words to the plurality of encrypted data words based on a data encryption method;

wherein both the plurality of first physical addresses and the plurality of second physical addresses are associated with an external memory to the microcontroller;

wherein each of the plurality of integrity words is associated with at least one of the plurality of the data words.

12. A method for extracting encrypted data words and integrity words within an external memory of a microcontroller, the method comprising:

receiving a plurality of logic addresses;

translating the plurality of logic addresses to a plurality of first physical addresses within the external memory and a plurality of second physical addresses within the external memory based on a data map, wherein the plurality of first physical addresses and the plurality of second physical addresses are interleaved;

reading a plurality of encrypted data words from the plurality of first physical addresses in the external memory and a plurality of integrity words from the plurality of second physical addresses in the external memory, each integrity word comprising a plurality of consecutive integrity sub-words of equal length, each integrity sub-word corresponding to an encrypted data word within the plurality of encrypted data words, each integrity word and the encrypted data words corresponding to the consecutive integrity sub-words within the integrity word have the same length;

decrypting the plurality of encrypted data words to a plurality of data words;

storing at least one complete integrity word with its integrity sub-words derived from successive data words, within the plurality of integrity words, in an integrity cache in the microcontroller prior to checking validity of the plurality of data words using the plurality of recovered integrity words based on an integrity check, the at least one complete integrity word being stored in the integrity cache for use by one or more consecutive data words read operations, wherein the integrity cache is different from a CPU cache; and outputting the plurality of data words if the plurality of data words are valid.

13. The method in claim 12 wherein the step of checking validity of the plurality of data words further comprises the steps of:

regenerating a plurality of regenerated integrity words from the plurality of data words based on the integrity check;

comparing the plurality of regenerated integrity words with the plurality of integrity words; and indicating the validity of the plurality of data words by comparison results that are associated with the consistency between the plurality of integrity words and the plurality of recovered integrity words.

14. The method of claim 12 wherein the validity of the plurality of data words is further applied to raise a CPU exception based on a security policy of the microcontroller. The CPU exception is exploited to implement at least one function selected from a group of functions including erasing the sensitive data, triggering a non-maskable interruption, writing a value in a flag register, resetting the microcontroller, and running a dedicated code.

15. The method of claim 12 wherein the external memory is one selected from a group consisting of read-only-memory (ROM), random-access-memory (RAM) and flash memory.

16. The method of claim 12 wherein each integrity word, within the plurality of integrity words, has a first number of bits and each encrypted data word, within the plurality of encrypted data words, has a second number of bits, the first number of bits being equal to the second number of bits.

17. The method of claim 12 wherein the plurality of encrypted data words and the plurality of integrity words are interleaved in the external memory.

18. The method of claim 17 wherein a subset of the plurality of encrypted data words are associated with an integrity word having a plurality of integrity sub-words corresponding to the subset of the plurality of encrypted data words, the subset being stored with the integrity word in an interleaved scheme within the external memory.

19. The method of claim 18 wherein the subset of the plurality of encrypted data words has eight encrypted data words and the integrity word has eight integrity sub-words.

* * * * *